UNITED STATES PATENT O[FFICE].

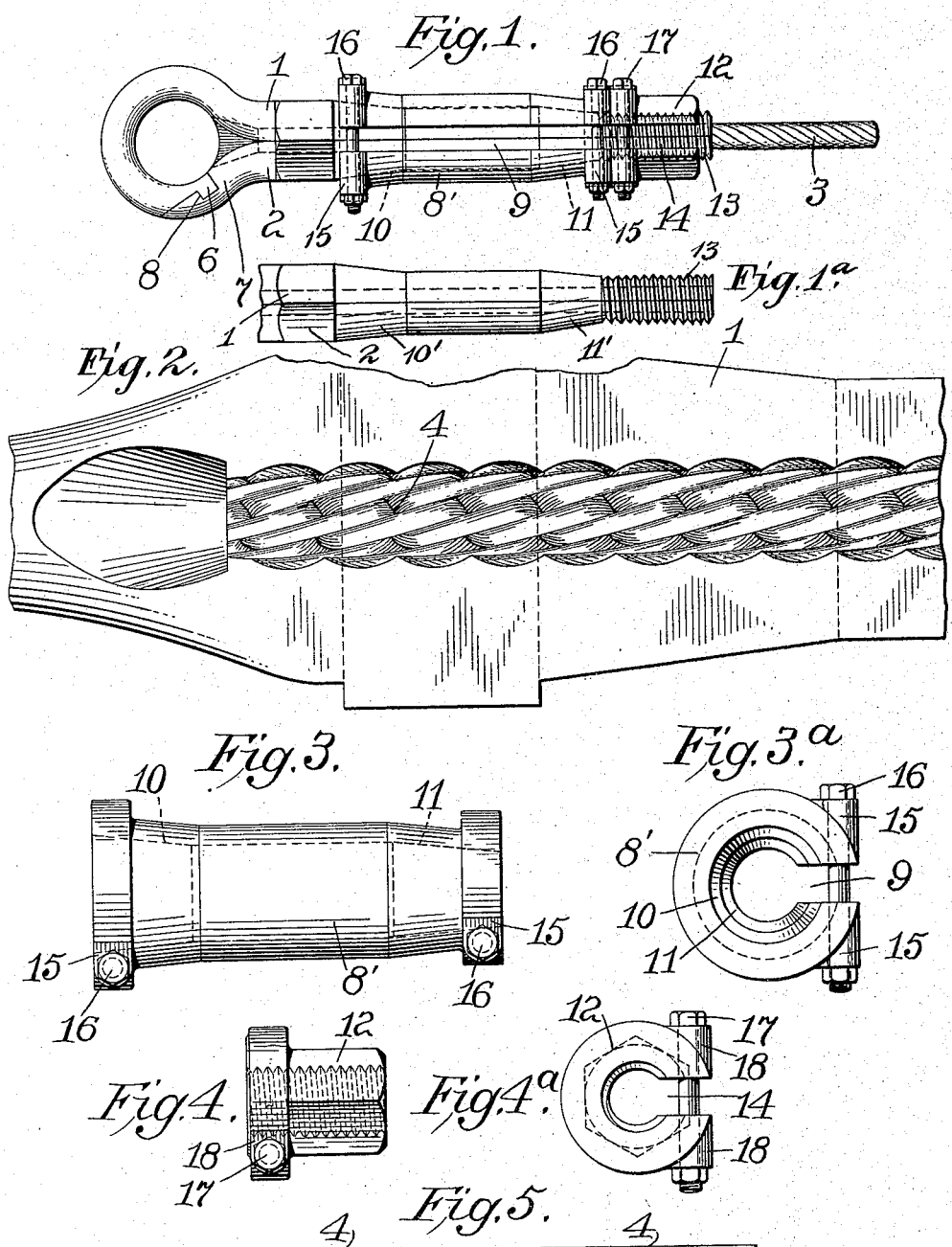

WILLIS GRANT MURRAY, OF SAN FRANCISCO, CALIF[ORNIA].

DETACHABLE MOVABLE CABLE-FASTENING.

1,171,233.     Specification of Letters Patent.     Pate[nted Feb. 8, 1916.]

Application filed April 1, 1914. Serial No. 828,793.

*To all whom it may concern:*

Be it known that I, WILLIS GRANT MURRAY, citizen of the United States, residing at San Francisco, California, have invented certain new and useful Improvements in Detachable Movable Cable-Fastenings, of which the following is a specification.

My invention concerns fastening devices for cables, and more particularly the type known as a "jump on" fastening, being designed to be applied to the ends of the cable or at any desired point between its terminals, though it will be understood that my invention is not limited to such use.

The invention consists in the features and combination and arrangement of parts hereinafter described and particularly pointed out in the claims.

In the drawings Figure 1 is a side elevation; Fig. 1ª is a view showing the clamping members 1 and 2 in elevation with the sleeve and nut removed; Fig. 2 is an enlarged detail of the inner face of one of the clamping members; Fig. 3 is a plan view of the slotted sleeve; Fig. 3ª is an end view of Fig. 3; Fig. 4 is a plan of the split nut; Fig. 4ª is an end view of Fig. 4; Fig. 5 shows a developed view along one of the spiral corrugations of the clamping members.

In these drawings, 1, 2, indicate two clamping members which are grooved along their meeting faces to receive and clamp the cable. These members are corrugated throughout their grooves to conform substantially to the corrugations of the cable indicated at 3. The corrugations, however, of the clamping members, while having the same general helical or spiral form of the cable strands, are provided with high and low points or parts so that when these members are clamped to the cable the high parts will bite into the cable and thus have a firmer grip thereon than would be the case if the spiral grooves or corrugations were of the same depth throughout. The high or biting points are indicated at 4, and the grooves between these points curve lengthwise, as indicated in Fig. 5.

The clamping members have at one end a fastening device to receive the cable which is to be attached to the cable carrying the members clamped thereon, and are also provided with an enlarged throat to receive the broomed out speltered end of the cable when used as a cable end. This fastening device consists of a hook-shaped portion on one of the clamping member[s] projection 6 at or near [the] clamping member has vided with a socket 8 tooth or projection. T[he] meeting ends of the cl[amping members are at] an angle to the ends o[f] tion transverse to the [length of the] ing device, which is gen[erally] This will make a joint strains laterally or long [with respect] to the fastener as a wh[ole, and] the ring will not separa[te under any strains.]

For holding the cl[amping members in] place, a clamping sle[eve 8' is provided] which is lotted at 9 lo[ngitudinally, so that] it may be applied to t[he cable by a "jump] on" action, that is to [say, the slot is of a] width equal to the diam[eter of the cable and] the sleeve therefor ma[y be applied to the] cable at any point inte[rmediate of its ends] by a movement in a d[irection laterally of] the said cable. This sl[eeve is provided with] two inclines 10, 11, at [or near its ends, and] the clamping members [have two correspond-] ing inclines 10', 11' to [be borne upon by the] inclines of the sleeve. [The sleeve is forced] lengthwise of its clamp[ing members to make] its inclines ride on t[he inclines of said] clamping members by a [nut 12 screwed onto] the threaded ends 13 of [said clamping mem-] bers, and when the desi[red degree of clamp-] ing effect is attained th[e nut will serve as a] holding means for the s[leeve. This nut also] is of a "jump on" ch[aracter, it having a] slot 14 wide enough to [receive the cable so] that the nut can be pa[ssed onto this cable] at any desired point [intermediate of its] length. When the devi[ce is used as a cable] the enlarged throat of t[he clamping members] receives and secures the [enlarged end of the] cable formed by the p[rocess of "brooming] out" and speltering.

While the design of t[he device admits the] mounting and dismount[ing of the cable end] without interfering wi[th this enlargement,] it also allows the spelte[red head referred to] to be made in an open d[ie in which it may be] quickly and better forn[ed.]

In order to prevent [the clamping sleeve] from spreading, I pro[vide ears 15 on each] edge of the slot at bot[h ends of the sleeve] adjacent the inclines o[n the sleeve. These] ears receive bolts 16, an[d by tightening these] up the sleeve will be he[ld against spreading] under the strain result[ing from the work-]

ing of the inclines of the sleeve on those of the clamping members, and also act as a locking device for both sleeve and nut to prevent loosening under strain or vibration. The nut is also provided with a bolt 17 passing through ears 18 on the bolt, thus serving to hold the nut against spreading.

In operating the device the clamping members 1, 2, which are separable, are placed on the cable at the desired points. The sleeve is then placed on the cable, the connecting bolts of course having been first removed to allow the cable to pass through the slot, and is moved lengthwise onto the clamping members; the nut is then applied to the cable, and is threaded onto the ends of the clamping members, and by turning the nut the slotted sleeve is forced up to make its inclines press upon the inclines of the clamping members and thus set the clamping members upon the cable, the points in the corrugations biting into the cable and making a firm connection.

The sleeve is made of one piece. By having the two inclines on each clamping member disposed at different points along the length thereof and by having the sleeve provided with corresponding inclines, the clamping effect will be distributed throughout the clamping members at and between the points where the inclines are located, and a firm attachment will be secured.

I claim as my invention:—

1. A cable socket comprising two clamping members having exterior inclines and threaded ends, and having their meeting faces provided with parallel grooves from end to end, making a throughway for the cable, said grooves being corrugated to fit and grip the corrugations of the cable, a one-part slotted sleeve having an inclined portion to engage the inclines on the clamping members, a slotted nut for pressing said sleeve longitudinally along the clamping members, and an attaching device on one of the clamping members, substantially as described.

2. In combination clamping members grooved longitudinally to receive a cable and corrugated spirally to conform substantially to the cable corrugations, said corrugations of the clamping members having transversely disposed high parts to bite into the cable, and a clamping sleeve and nut to press the clamping members together, substantially as described.

3. In combination in a cable socket, a pair of clamping members to engage a cable and having means for the attachment of another cable, said clamping members having inclines disposed at different points along the same, a jump on sleeve in one piece slotted longitudinally to receive the cable and having inclines at its ends to engage the inclines on the clamping members, and a nut slotted to receive the cable and threaded upon the ends of the clamping members and bearing on the clamping sleeve to force the same into place, substantially as described.

4. In combination in a cable socket, a pair of clamping members having inclines, a sleeve slotted longitudinally and having inclines to engage the inclines of the clamping members, a slotted clamping nut engaging screw threaded ends of the clamping members, and a removable connection extending from one edge of the slotted clamp to the other and a connection extending from one edge of the nut to the other, substantially as described.

5. In combination two clamping members, a sleeve slotted to receive a cable, said clamping members and said sleeve having each a pair of inclines, a slotted nut for holding the sleeve in place, and a removable reinforcing connection extending from one edge of the sleeve to the other at the inclines, substantially as described.

6. In combination a pair of clamping members to receive a cable between them, a sleeve to clamp the members in place, and a nut for holding the sleeve in place, one of said clamping members having a hook-shaped extension provided with a projection and the other clamping member having an extension with a recess to receive said projection, the joint between said extensions being at an angle to the radius of the hook-shaped member, substantially as described.

7. In combination in a cable socket, a pair of clamping members to engage the cable, said clamping members having inclines disposed at points spaced apart longitudinally along the same, and a clamping sleeve having inclined portions to engage the inclines on the clamping members, substantially as described.

In testimony whereof, I affix my signature in presence of two witnesses.

WILLIS GRANT MURRAY.

Witnesses:
C. E. PARSONS,
BENNETT S. JONES.

Copies of this patent may be obtained for five cents each, by addressing the "Commissioner of Patents, Washington, D. C."